(12) United States Patent
Muromachi et al.

(10) Patent No.: US 6,414,796 B1
(45) Date of Patent: Jul. 2, 2002

(54) HEAD-UP DISPLAY DEVICE AND LAMINATED GLASS FOR HEAD-UP DISPLAY DEVICE

(75) Inventors: Takashi Muromachi; Masanobu Kimura; Satoshi Furusawa, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/701,808

(22) PCT Filed: Jun. 2, 1999

(86) PCT No.: PCT/JP99/02957

§ 371 (c)(1),
(2), (4) Date: Dec. 1, 2000

(87) PCT Pub. No.: WO99/63389

PCT Pub. Date: Dec. 9, 1999

(30) Foreign Application Priority Data

Jun. 3, 1998 (JP) .............................................. 10-154889
Jun. 3, 1998 (JP) .............................................. 10-154890

(51) Int. Cl.$^7$ .............................. G02B 27/14; G09G 5/00
(52) U.S. Cl. ....................... 359/630; 359/631; 359/589; 359/894; 345/7; 345/8; 428/56; 428/156; 340/980
(58) Field of Search ................................ 359/630, 631, 359/633, 634, 637, 573, 589, 894; 428/56, 141, 156, 172; 345/7, 8; 340/980, 961, 461

(56) References Cited

U.S. PATENT DOCUMENTS

| | | | | |
|---|---|---|---|---|
| 3,686,626 A | * | 8/1972 | Bateman et al. | ............. 340/980 |
| 4,968,117 A | * | 11/1990 | Chern et al. | ................. 359/589 |
| 5,013,134 A | | 5/1991 | Smith | ........................... 359/630 |
| 5,639,538 A | * | 6/1997 | Wong | ........................... 428/156 |
| 5,812,332 A | | 9/1998 | Freeman | ..................... 359/894 |
| 5,825,339 A | * | 10/1998 | Furuya et al. | ................. 345/8 |
| 6,327,084 B1 | * | 12/2001 | Nishikawa et al. | ......... 359/630 |

FOREIGN PATENT DOCUMENTS

| | | |
|---|---|---|
| GB | 2 264 452 | 9/1993 |
| JP | 63-72122 | 5/1988 |
| JP | 3-209210 | 9/1991 |
| JP | 4-42188 | 10/1992 |
| JP | 6-1142 | 1/1994 |
| JP | 7-175007 | 7/1995 |
| JP | 7-195959 | 8/1995 |

* cited by examiner

Primary Examiner—Loha Ben
(74) Attorney, Agent, or Firm—Merchant & Gould PC

(57) ABSTRACT

For prevention of ghost images from occurring on head-up displays, a glass surface is ground, and a reflecting surface with a wedge-shaped cross section is formed. Furthermore, in order to reduce optical distortion at the edge portion of the reflecting surface, a ground surface contacting the reflecting surface with an angle between 150° and 210° is formed. In accordance with the enlargement of the reflecting surface accompanied by the tendency of head-up displays becoming larger, the reflecting surface is divided into at least two regions, and the angle of the reflecting surface is optimized for each region.

19 Claims, 21 Drawing Sheets

FIG. 19
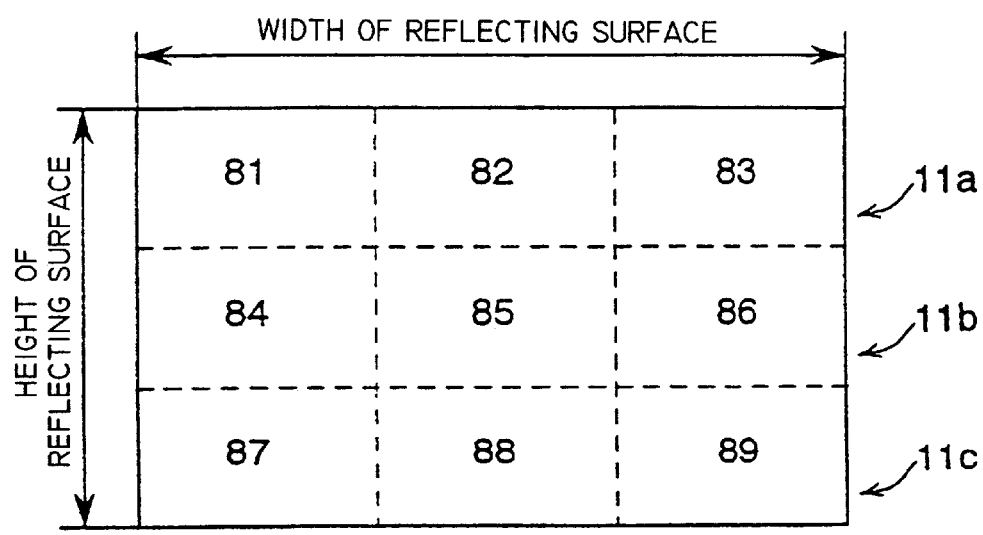

HEAD-UP DISPLAY DEVICE AND LAMINATED GLASS FOR HEAD-UP DISPLAY DEVICE

TECHNICAL FIELD

The present invention relates to head-up display (referred to as "HUD" in the following) devices for a vehicle. More specifically, this invention relates to a HUD device with reduced double-images. The present invention also relates to a laminated glass used for the windshield glass in such a HUD device.

BACKGROUND ART

In recent years, HUD devices have come into use not only in aircraft but also in land vehicles such as automobiles. HUD devices project information light signals emitted from information projecting means such as an LCD device onto the windshield glass, where it is reflected to provide the operator with necessary information. When HUD devices are used, the operator can allow an information display as a virtual image to enter his visual field beyond the windshield glass, so that he can perceive the information display without diverting his attention much from navigation.

Conventionally, information displays with a HUD device posed the problem of so-called ghost images. Ghost images appear when the information light signals reflected by the external surface of the windshield glass and the information light signals reflected by the internal surface of the windshield glass form virtual images at different positions. In a conventional windshield glass 101 illustrated in FIG. 20, light rays traveling from a light source 102 to the eyepoint of an observer 103 take two different light paths. In other words, a light path 124 taken by a light ray 121 that is reflected at an internal surface 111 does not match a light path 123 taken by a light ray 122 that is reflected at an external surface 112, so that virtual images 104 and 105 are formed at separate positions to cause ghost images (double-images).

In order to prevent ghost images from appearing, a windshield glass with a wedge-shaped cross section has been proposed.

For example, in JP3-209210A, two glass sheets with a polyvinyl butyral (PVB), film as an intermediate layer, which has been formed by extrusion so that its cross section is wedge-shaped, are attached to one another to form a laminated glass sheet. This laminated glass sheet is used for the windshield glass of a HUD device. The same publication teaches that due to the nonparallel internal and external surfaces of the windshield glass, the light path difference of the information light signals reflected at both surfaces can be decreased, and the image separation (double-image) caused by the light path difference can be reduced.

JP7-175007A teaches that in a HUD display device, ghost images can be reduced by configuring an intermediate layer or a glass sheet as a tapered sheet. The HUD device actually disclosed in this publication, as in JP3-209210A, uses a laminated glass sheet with a tapered intermediate layer.

JP7-195959A, like JP7-175007A, teaches that ghost images in a HUD device can be reduced by devising an intermediate layer or a glass sheet as a tapered sheet. Moreover, in the same publication, a HUD device using a windshield glass with a partially wedge-shaped cross section is disclosed. In this windshield glass, only the area portion in front of the operator is partially wedge-shaped. For such a windshield glass, this publication discloses in particular a laminated glass of glass sheets attached to each other with an intermediate layer that has been partially processed into a wedge shape by extending differentially. Moreover, this publication proposes a glass sheet that is tapered at a selected area portion, which is formed by adding a partially tapered glass piece to the glass sheet of a certain thickness, or partially polishing the glass sheet.

In addition, JP63-72122U discloses a front glass with a partially ground internal surface. As shown in FIG. 21, the surface of a windshield glass 131 in this publication is ground so as to form a reflecting surface 135 and a ground surface 136 that is connected to the reflecting surface 135. In this way, a light path 137 travelling from a light source 132 to an eyepoint 133 is unified. Also, a combiner 138 is formed on the reflecting surface 135.

As described above, the first method for suppression of ghost images in conventional HUD devices involves the processing of an intermediate layer, which joins two glass sheets, into a wedge shape. However, when an intermediate layer with such a wedge-shaped cross section is used, the problem arose that it became difficult to vent the air between the glass sheets and the intermediate layer in the process of joining the two glass sheets by means of the intermediate layer. Moreover, when producing small lots of intermediate layers that conventionally have been produced in large quantities, the manufacturing costs also rose.

The second method for suppression of ghost images involves the grinding of the surface of a glass sheet partially into a wedge shape. This method is described in detail in JP63-72122U. However, as described in this publication, the problem with this method is that the grinding of the glass surface (See FIG. 21) degrades the quality of the windshield glass due to the optical distortion caused by the refraction of light at the glass surface, and particularly by the refraction of light at an inflection point 140 at the glass surface.

Moreover, in recent years, screens of HUD devices have tended to become larger in accordance with the diversification of information to be provided. If the screen becomes larger, the reflecting surface of the glass surface also needs to be enlarged. When the reflecting surface is enlarged to a bigger size, incident angles of light from a light source cannot always be regarded as identical at some regions of the reflecting surface. However, in the conventional windshield glass described above, incident angles of light are regarded as the same within the reflecting surface, and the cases in which incident angles are different are not taken into consideration.

DISCLOSURE OF THE INVENTION

The present invention has been conceived in consideration of these circumstances, and one of its objects is to provide a HUD device with reduced ghost images and reduced optical distortion of the windshield glass without forming a wedge-shaped intermediate layer. It is another object of the present invention to provide a HUD device that can suppress ghost images effectively even in the case where the reflecting surface of a glass surface is enlarged. It is a further object of the present invention to provide a laminated glass used for the windshield glass of such a HUD device.

A first head-up display device according to the present invention comprises information projection means emitting information in the form of light rays, and a windshield glass having a reflecting surface for reflecting the light rays toward an observer inside a vehicle. In this device, a first light path is defined between a first reflecting surface prepared on an internal surface of the windshield glass and the observer by a first light ray that is emitted from the information projection means, reflected by the first reflecting surface, and projected toward the observer, and a second light path is defined between the internal surface and the observer by a second light ray that is emitted from the information projection means, refracted into the windshield glass at the internal surface, reflected by a second reflecting surface prepared on an external surface of the windshield glass, and refracted out of the windshield glass at the internal surface toward the observer.

The first reflecting surface and the second reflecting surface are non-parallel to each other so that the first light path and the second light path are approximating each other (preferably substantially matching each other) more than when the first reflecting surface and the second reflecting surface are arranged in parallel to each other. At least one surface selected from the first reflecting surface and the second reflecting surface is a ground reflecting surface formed by grinding the surface of the windshield glass so as to set the non-parallelity of the reflecting surfaces. The surface of the windshield glass includes a ground surface contacting the ground reflecting surface with an angle between 150° and 210°, which is a difference of less than 30° with 180°.

When the surface of a glass sheet is partially ground to form a reflecting surface that is not parallel to the other reflecting surface, light is refracted locally at an edge of the reflecting surface, so that optical distortion occurs in the windshield glass. Therefore, the above first HUD device is provided with a ground surface contacting a reflecting surface, which is formed so as to reduce this optical distortion.

Thus, in the first HUD device according to the present invention, ghost images can be suppressed effectively without processing an intermediate layer into a wedge shape, and optical distortion occurring when a glass sheet is partially processed can be suppressed.

Furthermore, a second head-up display device of the present invention is identical with the first HUD device in that at least one surface selected from the first reflecting surface and the second reflecting surface is a ground reflecting surface formed by grinding the surface of the windshield glass so as to set the non-parallelity of the reflecting surfaces. In addition to this aspect, the second HUD device of the present invention is characterized in that the ground reflecting surface has a distribution of angles with the surface of the windshield glass in a non-ground state so as to reduce the divergence between the first light path and the second light path caused by different incident angles of light rays from the information projection means in compliance with the position in the reflecting surface.

When images are enlarged in accordance with the diversification of information to be provided, the reflecting surface of the windshield glass is also enlarged. As the reflecting surface becomes larger, the reflecting surface having a constant angle with the non-ground surface cannot suppress ghost images effectively. Therefore, the above second HUD device is configured such that the angle between the ground reflecting surface and the non-ground surface is adjusted in compliance with the position in the reflecting surface.

Thus, since the above second HUD device is provided with a ground reflecting surface having a distribution of angles which is adjusted in this manner, ghost images can be suppressed more effectively than when a ground reflecting surface having a constant angle is used. The above HUD device is particularly effective in the case where images provided by the HUD device are large. In addition, the above HUD device can suppress ghost images without processing an intermediate layer into a wedge shape.

BRIEF DESCRIPTION OF THE DRAWINGS

FIG. 19 is a plan view showing an example of the way of dividing a reflecting surface of the windshield glass included in a second HUD device.

BEST MODE FOR CARRYING OUT THE INVENTION

First HUD Device

Figure 1:
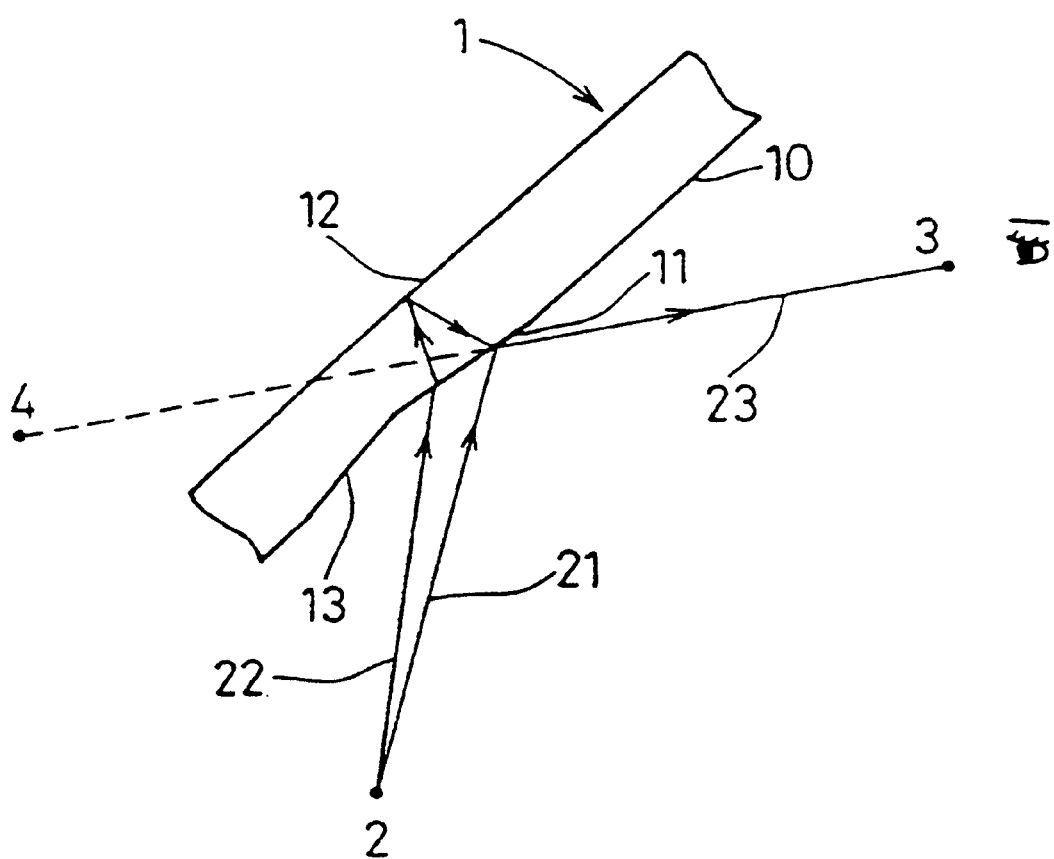
FIG. 1 is a drawing of one embodiment of a HUD device according to the present invention taken from a cross-sectional direction of a windshield glass.

Hereinafter, preferred embodiments of a first HUD device will be described.

In this HUD device, it is preferable that the angle between the ground reflecting surface and the non-ground surface of the windshield glass is between 0.1 mrad and 5.0 mrad, and particularly between 0.2 mrad and 1.0 mrad.

Moreover, in the above HUD device, it is preferable that the ground surface is formed so as to contact the reflecting surface substantially with an angle of 180° (e.g. 180°±10°, preferably 180°±5°). Accordingly, the refraction of light can be eliminated effectively. If there is no clear apparent distinction between the two surfaces, then it is sufficient to regard the range wherein the light rays can be reflected from the information projection means to the eyepoint of an observer as the reflecting surface.

Moreover, in the above HUD device, it is preferable that the first reflecting surface on the internal side is formed by grinding, and the second reflecting surface on the external side is a non-ground surface. Accordingly, water and dust etc. are less likely to accumulate in a ground concave portion.

Moreover, in the above HUD device, it is preferable that the ground reflecting surface is formed by grinding the surface of the windshield glass such that the grinding depth from the glass surface increases as it approaches the information projection means. Accordingly, the reflecting surface that is advantageous for restraining ghost images can be obtained.

Furthermore, in this case, it is preferable that at least an edge of the reflecting surface formed on the side of the information projection means contacts the ground surface. This is because the largest optical distortion occurs at the edge on the side of the information projection means. Moreover, it is preferable that the surface of the windshield glass further includes a ground surface that contacts an edge adjacent to the edge of the reflecting surface formed on the side of the information projection means. Accordingly, the optical distortion can be suppressed even more. In general, the information projection means will be arranged below the windshield glass. Consequently, the edge of the reflecting surface on the side of the information projection means is usually an edge located on the lower side of the reflecting surface, and the edges adjacent to this edge are edges located on (both) sides of the reflecting surface.

Moreover, in the above HUD device, it is preferable that an angle between the ground surface and the non-ground surface is not more than 20 mrad, and particularly not more than 10 mrad.

Moreover, in this HUD device, it is preferable that the ground surface has, in a peripheral region within 150 mm from a peripheral edge of the windshield glass, an edge that is opposite to the edge contacting the reflecting surface. As a result, the optical distortion at the edge that is opposite to the edge contacting the reflecting surface (edge located on the opposite side to the reflecting surface) is less conspicuous. Thus, in this HUD device, it is preferable that the ground surface is formed such that the ground surface extends to a region where the optical distortion does not easily enter the visual field of an observer operating the vehicle.

Furthermore, it is preferable that, in a central region excluding a peripheral region (the region excluding a peripheral region within 150 mm from a peripheral edge of the windshield glass), the ground surface and the non-ground surface of the windshield glass form an angle of not more than 10 mrad, and particularly not more than 5 mrad. According to this preferable example, the optical distortion effectively can be reduced in a region that easily enters the visual field of an observer who is operating the vehicle.

Moreover, in this HUD device, it is preferable that a shading band is formed at least in a part of the periphery of the windshield glass. Moreover, in this case, it is preferable that the ground surface has, in a region where the shading band is formed, an edge that is opposite to the edge contacting the reflecting surface. Accordingly, the optical distortion at the edge of the ground surface on this opposite side can be concealed by the shading band.

In this case, for further reduction of optical distortion, it is preferable that, in a region of the windshield glass excluding the region where the shading band is formed, the ground surface and the non-ground surface form an angle of not more than 10 mrad, and particularly not more than 5 mrad.

Moreover, it is preferable in the above-mentioned HUD device that, taking as a reference point an intersecting point of the windshield glass with a center axis of a visual field, where the center axis of a visual field advances from an eyepoint of the observer in the light path parallel to a center axis of the vehicle within a horizontal plane including the eyepoint of the observer, a first border plane is determined by parallel translation of a perpendicular plane including the reference point for 500 mm from the reference point toward the center axis of the vehicle, and a second border plane is determined by parallel translation of the perpendicular plane for 250 mm from the reference point away from the center axis of the vehicle. In the surface between the first and the second border plane, excluding a peripheral region within 150 mm from the periphery of the windshield glass, an angle between the ground surface and the non-ground surface is not more than 5 mrad, and particularly not more than 3 mrad.

Alternatively, it is preferable in this HUD device that, taking as a reference point an intersecting point of the windshield glass with a center axis of a visual field, where the center axis of a visual field advances from an eyepoint of the observer in the light path parallel to a center axis of the vehicle within a horizontal plane including the eyepoint of the observer, a first border plane is determined by parallel translation of a perpendicular plane including the reference point for 500 mm from the reference point toward the center axis of the vehicle, and a second border plane is determined by parallel translation of the perpendicular plane for 250 mm from the reference point away from the center axis of the vehicle. A third and a fourth border plane are determined by parallel translation of a horizontal plane including the reference point for 100 mm up and down from the reference point respectively. In the surface of the windshield glass circumscribed by the first to the fourth border planes, an angle between the ground surface and the non-ground surface is not more than 5 mrad, and particularly not more than 3 mrad.

With such a windshield glass, optical distortion in a region that easily enters the visual field of an observer operating the vehicle can be suppressed even more.

Furthermore, a laminated glass for a first head-up display device, used as a windshield glass together with information projection means emitting information as light rays, includes a reflecting surface for reflecting the light rays toward an observer in a vehicle and comprises at least two glass sheets attached to each other with an intermediate layer. The reflecting surface includes a ground surface formed by partial grinding of a surface of the glass sheet, and the surface of the glass sheet includes a ground surface formed so as to contact the ground reflecting surface with an angle between 150° and 210°.

The preferred embodiments of a first HUD device will be further described below with reference to the drawings.

The following is an explanation of one embodiment of a HUD device according to the present invention with reference to FIG. 1. An internal surface of a windshield glass 1 used for this HUD device is partially ground to provide a reflection surface 11 for reflecting information light signals. This reflection surface 11 reflects a light ray 21 emitted from information projection means (light source) 2 to an eyepoint 3 of an observer. Thus, the observer can observe the information by the light ray as a virtual image 4 beyond the windshield glass 1.

A light path that a light ray can take to travel from the information projection means 2 to the observer 3 is not only the light path of the light ray reflected directly by an internal surface 10 of the windshield glass 1. A light ray 22 that is emitted by the information projection means 2 and refracted into the windshield glass is reflected by an external surface 12, and refracted again at the internal surface 11. The light ray then goes out from the internal surface 11 and also reaches the eyepoint 3 of the observer.

Moreover, with the windshield glass shown in FIG. 1, the internal reflecting surface 11 and the external reflecting surface 12 are set in a wedge shape, and furthermore, the non-parallelity of the reflecting surfaces attained by this wedge shape is defined such that the light rays 21 and 22 that can reach the eyepoint 3 of the observer by reflecting at the reflecting surfaces 11 and 12 take the same light path between the windshield glass 1 and the eyepoint 3. Thus, by forming the cross section of the windshield glass into a wedge shape at least in regions where the light rays from the information source are reflected, ghost images of the HUD device can be reduced or even eliminated.

In FIG. 1, for illustration purposes, the distances between the information projection means, the virtual image (imaging point), and the eyepoint and the windshield glass have been illustrated as much shorter than the actual distances in spite of the thickness of the illustrated windshield glass. Consequently, the actually required wedge angles of the reflecting surface and the ground surface are much smaller than the angles illustrated. A wedge angle 51 of the reflecting surface for a regular vehicle structure as described above is preferably between 0.1 mrad and 5.0 mrad, and particularly about 0.2 mrad to 1.0 mrad. Thus, because the required wedge angle is small, the amount that has to be ground from the glass sheet also may be small.

Ghost images in HUD devices might be reduced to some extent also with the use of a laminated glass, in which two glass sheets attached to each other have an intermediate layer with a wedge-shaped cross section. However, using such an embodiment that has been proposed conventionally on an industrial scale will incur defects during the manufacturing process. Moreover, it is not easy to define such a microscopic wedge angle precisely.

The reflecting surface 11 in FIG. 1 is formed by grinding a glass surface into a taper shape that becomes deeper as the reflecting surface approaches the information projection means 2. Therefore, a lower edge of the reflecting surface 11 has been ground the deepest from the surface. Also, a ground surface 13 is provided in the windshield glass 1 such that the ground surface contacts the reflecting surface 11 at its lower edge.

Figure 2:
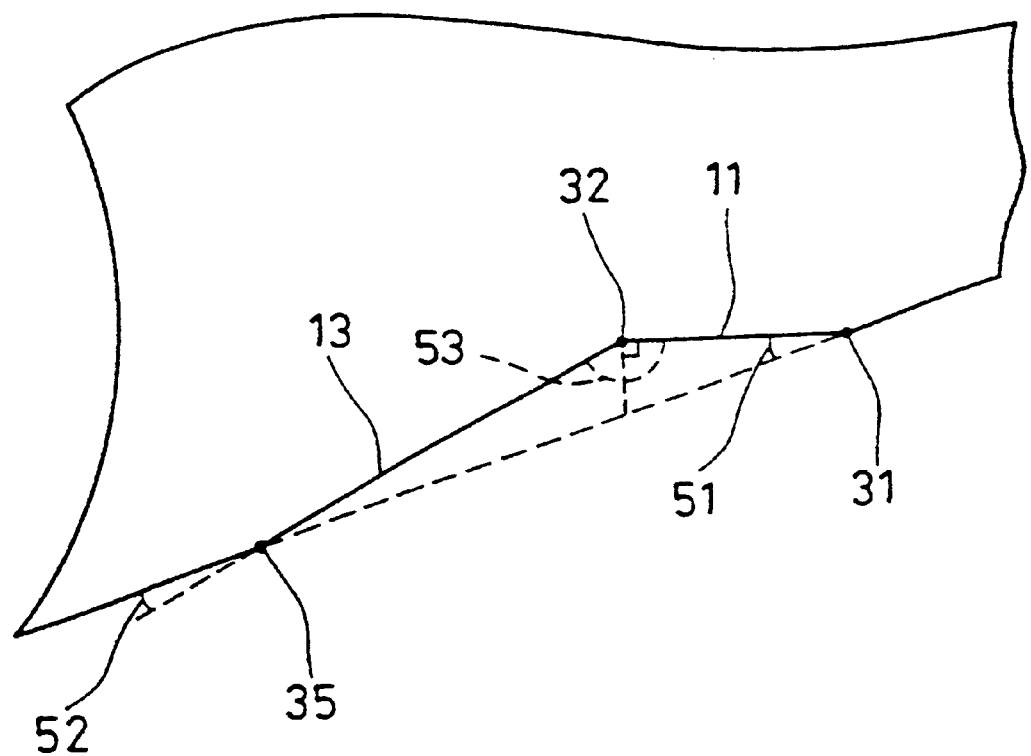
FIG. 2 is an enlarged drawing of the windshield glass used for a first HUD device.

FIG. 2 is an enlarged drawing showing the vicinity of the reflecting surface 11. At a lower edge 32, the ground surface 13 and the reflecting surface 11 are connected at a certain angle 53. Specifically, the angle 53 is formed by the ground surface 13 and the reflecting surface 11 on the air side (internal side) with an angle between 150° and 210°, and particularly between 170° and 190°. As long as the reflecting surface 11 having a predetermined wedge angle is formed (i.e. if it is intended only to process the glass sheet surface where light rays can be projected from the information projection means onto a reflecting surface having a certain wedge angle), there is no need to limit the angle defined between the ground surface 13 and the reflecting surface 11. This angle usually may be set at about 90°, so that the glass is not ground more than necessary. However, in the above windshield glass, the glass sheet is ground so that the surfaces 11 and 13 form a large angle, and in this way, the refraction of the light rays at the border 32 of both surfaces is reduced.

In the embodiment shown in FIG. 2, the angle 53 between the two surfaces, a wedge angle 51 of the reflecting surface, and a wedge angle 52 of the ground surface add up to 180°. The wedge angle 51 of the reflecting surface is set in advance to a preferable angle for elimination of ghost images. Therefore, to enlarge the angle 53 for further suppression of optical distortion occurring at the lower edge 32 of the reflecting surface, it is preferable that the wedge angle 52 of the ground surface is small. As the wedge angle 52 becomes smaller, the angle 53 between the two surfaces becomes larger, and at the same time, a lower edge 35 of the ground surface is shifted to a lower part of the windshield glass. Not only the enlargement of the angle 53, but also the movement of the lower edge 35 of the ground surface to the lower part is preferable to make the optical distortion in the windshield glass less conspicuous. This is because the optical distortion at the lower edge 35 of the ground surface is less likely to enter the visual field of the observer driving the vehicle.

Figure 3:
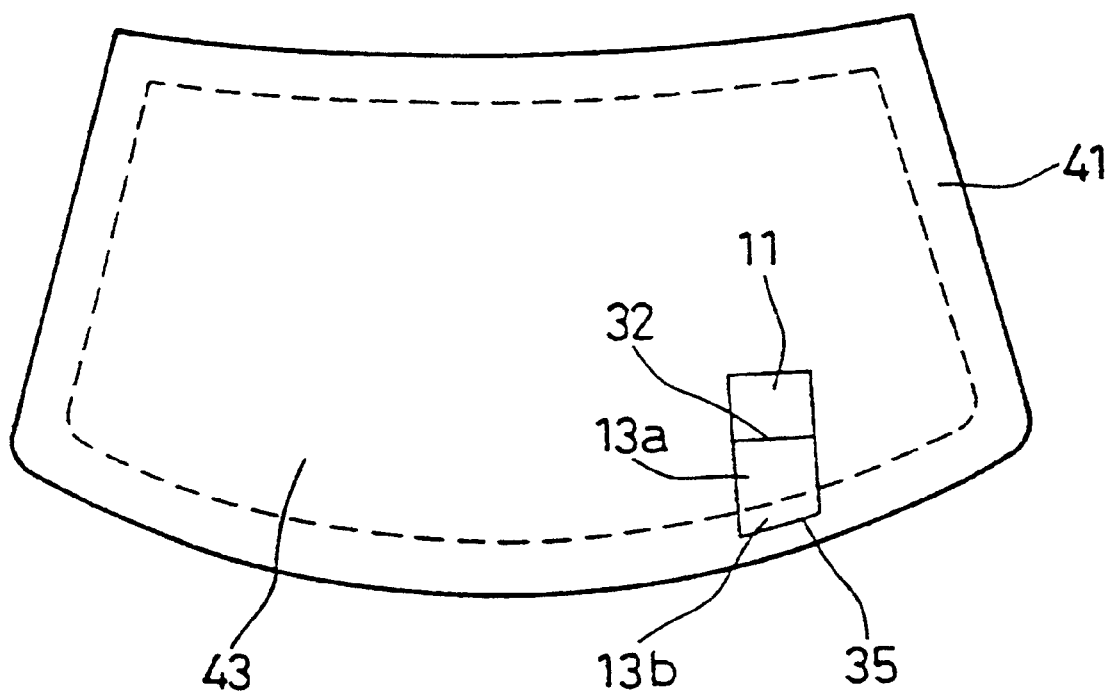
FIG. 3 is a plan view showing an example of the windshield glass included in a first HUD device.

Specifically, it is preferable that the lower edge 35 of the ground surface is present in a peripheral region within 150 mm from a peripheral edge of the windshield glass, as illustrated in FIG. 3. In this case, the ground surface 13 is not limited to the embodiment shown in FIG. 3, but also can be extended to the peripheral edge of the windshield glass.

It is particularly preferable that a wedge angle of a ground surface 13a belonging to a central region 43 of the windshield glass excluding a peripheral region 41 is not more than 5 mrad, because this can reduce the optical distortion. On the other hand, a wedge angle of a ground surface 13b belonging to the peripheral region 41 does not necessarily have to be set to be a small wedge angle. For example, after the ground surface 13a has been ground at the above wedge angle, and the grinding has reached the region of the ground surface 13b, the grinding may be stopped in this region and the grindstone may be drawn out to reduce the volume of grinding.

As becomes clear from the above explanation, the ground surface 13 does not need to have a constant wedge angle over its entire surface. The ground surface 13 may be comprised of a plurality of regions with different wedge angles or formed as a surface including a curved surface, as long as the optical distortion caused by the formation of the reflecting surface can be reduced.

Figure 4:
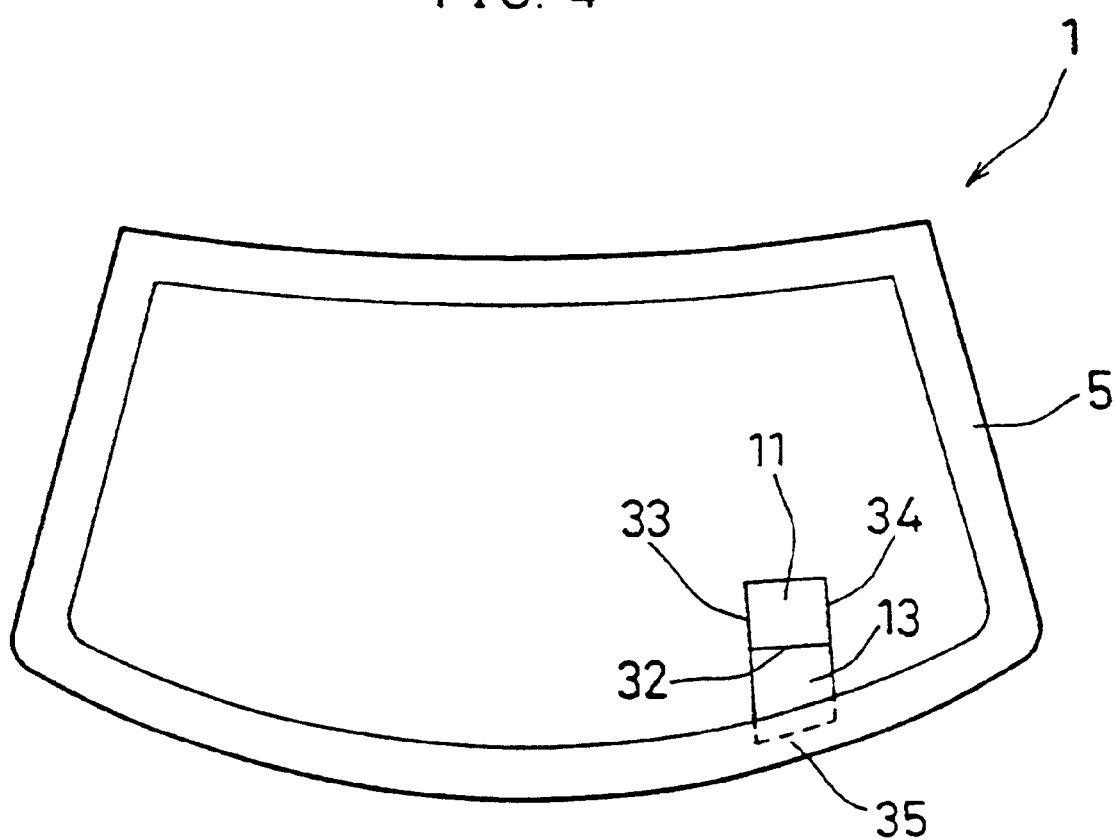
FIG. 4 is a plan view showing another example of the windshield glass included in a first HUD device.

It is preferable in the windshield glass of the present invention that a shading band 5 is formed, for example, by ceramic print in the peripheral region of the windshield glass, as shown in FIG. 4. If such an opaque region is formed, then it is preferable to use this region and form the ground surface 13 such that the lower edge 35 belongs to the region where this shading band is formed. Also in this case, it is particularly preferable that the wedge angle of the ground surface in the region where the shading band 5 is not formed is not more than 5 mrad.

As has been pointed out above, it is preferable in the windshield glass 1 that the ground surface 13 is formed such that the ground surface contacts at least the lower edge 32 of the reflecting surface 11. However, to suppress the optical distortion of the windshield glass even more effectively, it is preferable that the ground surfaces are formed so as to contact edges also on the (both) sides (33 and 34 in FIG. 4) of the reflecting surface.

Figure 5:
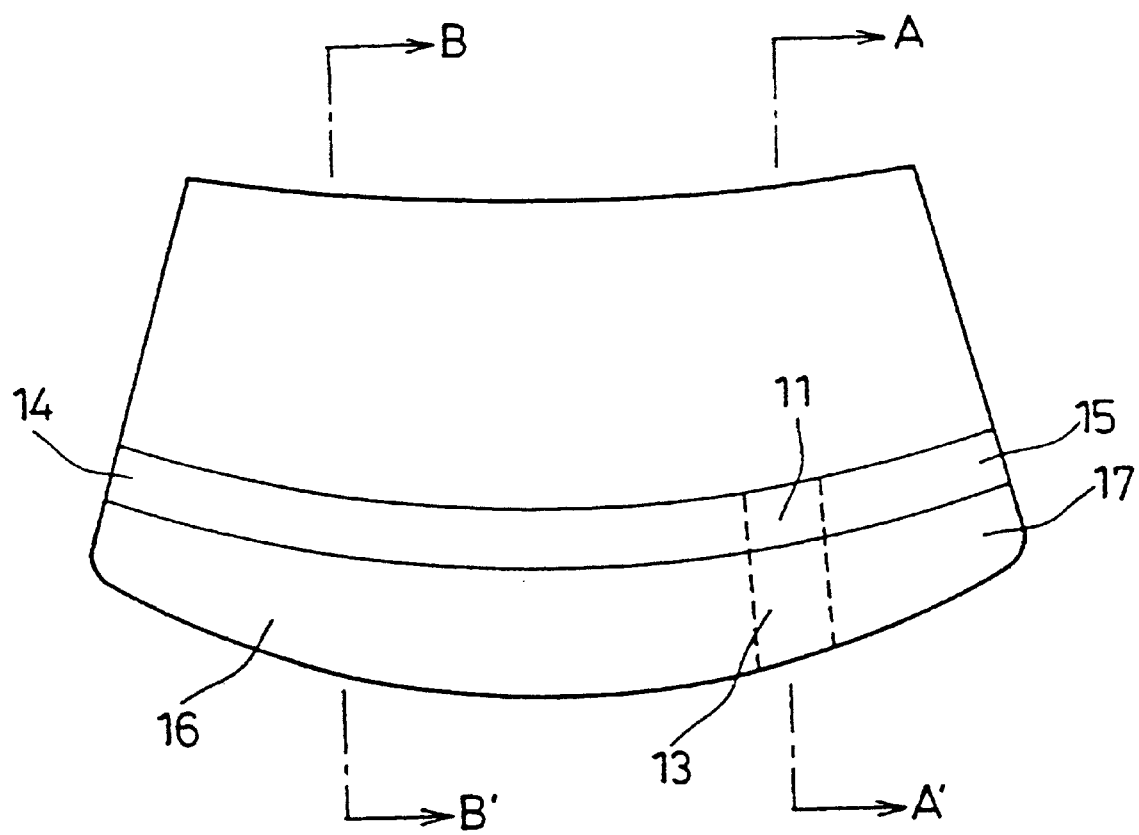
FIG. 5 is a plan view showing a further example of the windshield glass included in a first HUD device.
Figure 6:
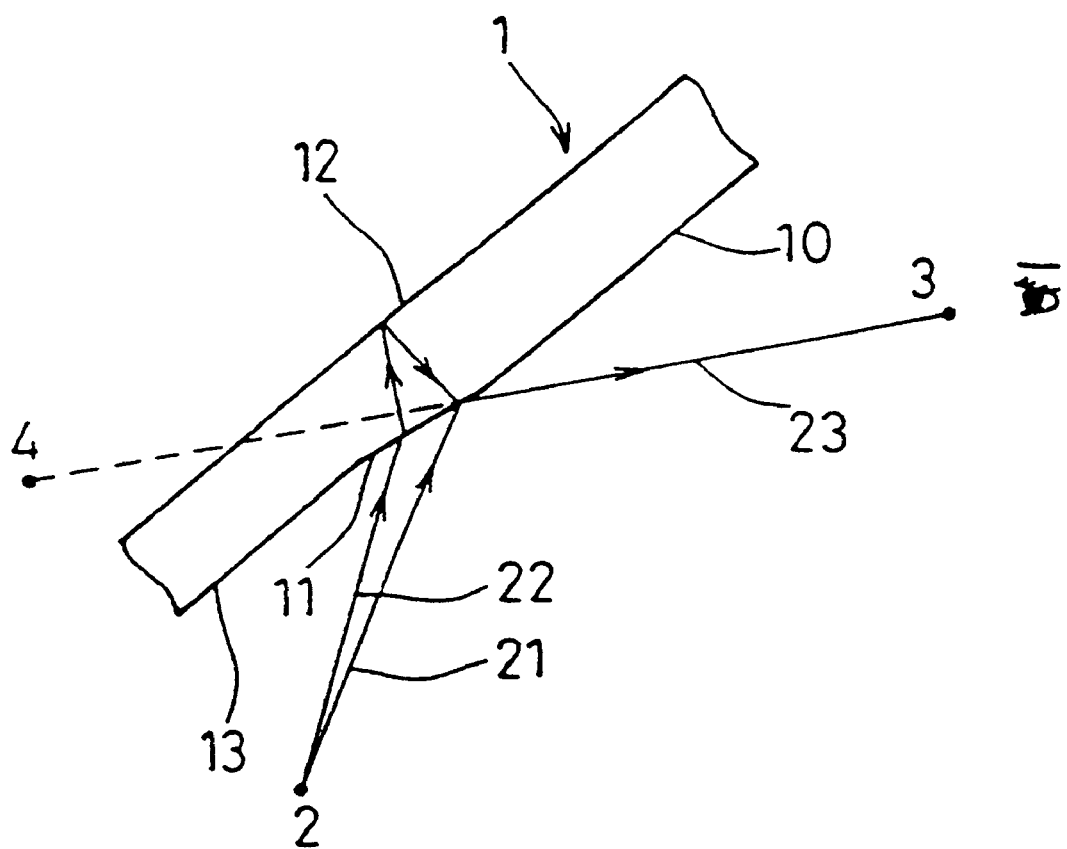
FIG. 6 is a partial cross-sectional view of the windshield glass shown in FIG. 5 taken along A–A'.

FIG. 5 shows an example of a windshield glass provided with a ground surface formed to contact the side edge portions of the reflecting surface 11. In this glass, ground surfaces 14 and 15 are formed also on the flanks of the reflecting surface 11. These ground surfaces 14 and 15 are formed, for example, as surfaces of the reflecting surface 11 being extended to the right and the left sides (that is, as surfaces with the same wedge angle as the reflecting surface). Moreover, in this glass, ground surfaces 16 and 17 are formed also on the flanks of the ground surface 13 contacting the lower part of the reflecting surface 11. These ground surfaces 16 and 17 are formed, for example, as surfaces of the ground surface 13 contacting the lower part of the reflecting surface being extended to the right and the left sides. FIG. 6 is a partial cross-sectional drawing taken along A–A' of the windshield glass shown in FIG. 5. In this windshield glass, the ground surface 13 is almost parallel to the non-ground surfaces 10 and 12. Moreover, this windshield glass is ground such that a cross section along B–B' also becomes the same as in FIG. 6. If the windshield glass is ground as shown in FIGS. 5 and 6, the optical distortion can be very effectively suppressed, even if the volume of grinding will increase.

The windshield glass shown in FIG. 5 has a surface where edge portions of the reflecting surface formed into a wedge shape, which may cause the problem of optical distortion, have been relegated without exception to the peripheral portion of the windshield glass. However, to decrease the volume of grinding, as with the ground surface 13 contacting the lower part of the reflecting surface, the ground surfaces 14 and 15 contacting both sides of the reflecting surface may be formed so as to relegate the edge portions of the ground surfaces to the regions that do not easily enter the visual field of the observer, instead of grinding the surfaces all the way to the edge portions of the windshield glass.

In this case, it is preferable that, as described above, the ground surface is formed such that the ground surface has the other edge belonging to a peripheral region within 150 mm from a peripheral edge of the windshield glass or to a region where a shading band is formed. Also when the ground surfaces are formed on the flanks of the reflecting surface, it is preferable that the ground surfaces are formed such that regions that easily enter an observer's visual field have wedge angles within a predetermined range.

However, since the windshield glass is oblong to the right and the left sides, it is furthermore preferable that regions in the width direction of the windshield glass are determined by particularly taking the actual visual field of the vehicle's operator (observer) into consideration.

Figure 7:
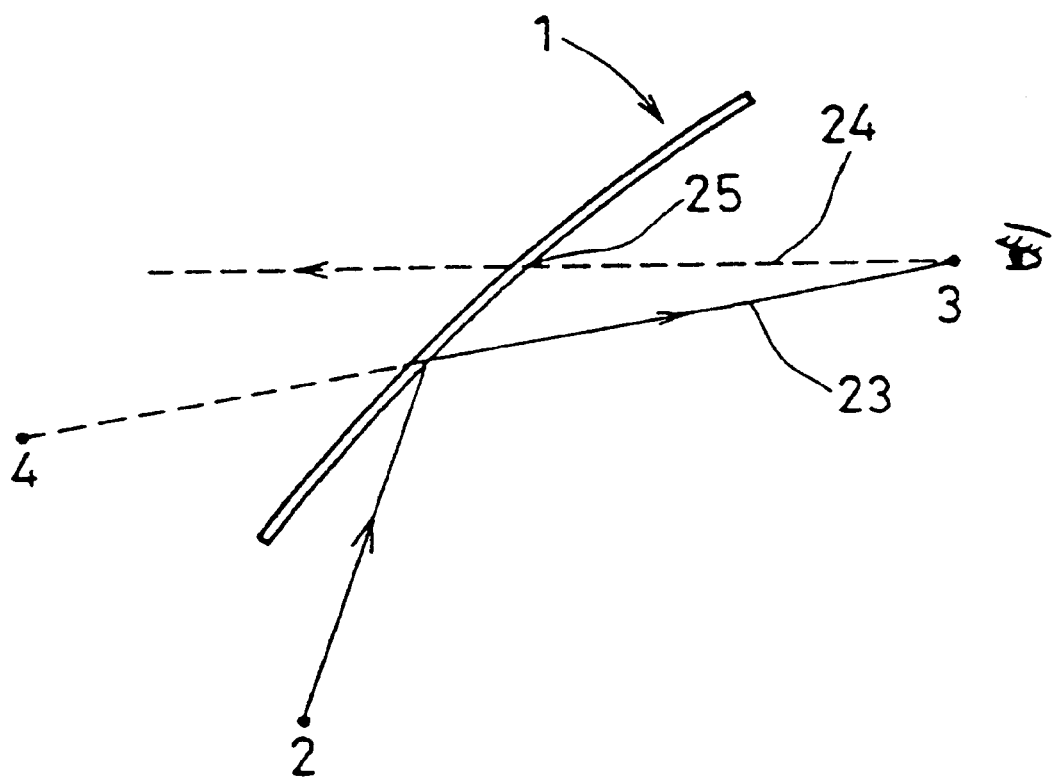
FIG. 7 is a drawing illustrating a center point of a visual field in the windshield glass included in a first HUD device.
Figure 8:
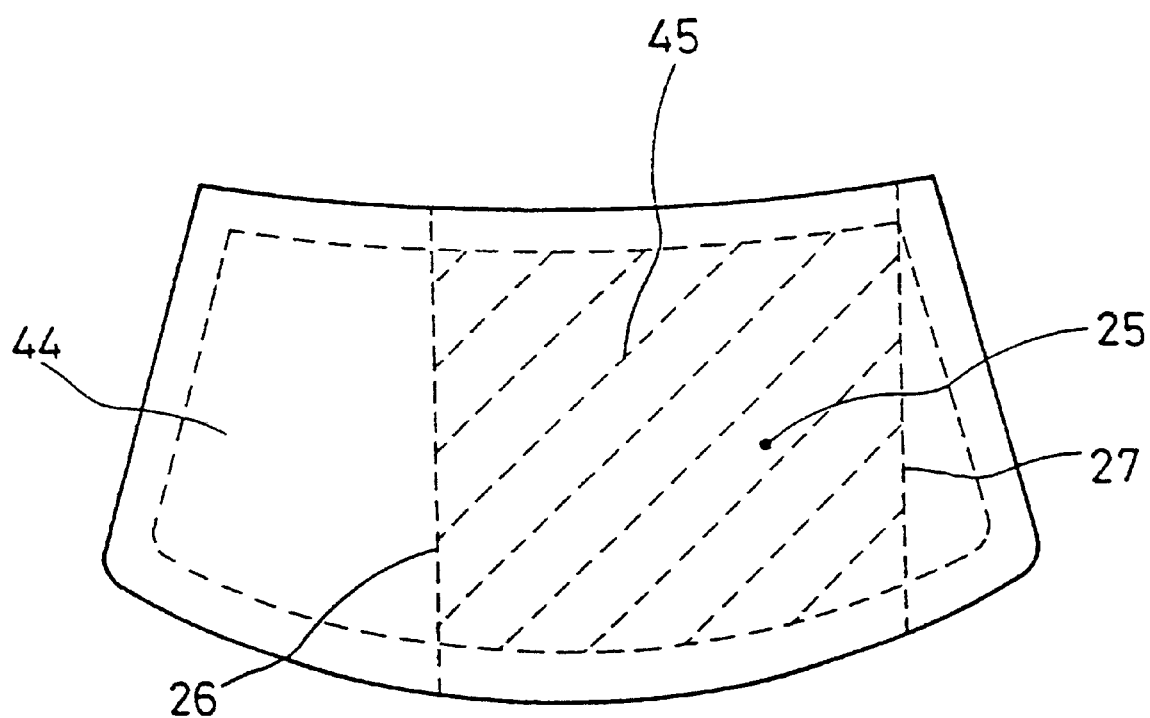
FIG. 8 is a drawing illustrating a center region of a visual field in the windshield glass included in a first HUD device.

FIGS. 7 and 8 illustrate a region that easily enters the visual field of the operator in a regular vehicle, such as a car. First, as shown in FIG. 7, a center axis of a visual field 24 is determined so as to become parallel to a center axis of the vehicle and to lie within a horizontal plane including the eyepoint 3 of the observer who operates the vehicle. Then, the point where the center axis of the visual field 24 contacts the windshield glass is determined as a center point of the visual field 25. Next, this center point of the visual field 25 is determined as a reference point, and a first border plane 26 is determined as a perpendicular plane including the reference point which is moved parallel for 500 mm in the direction approaching the center axis of the vehicle, and a second border plane 27 is determined as a perpendicular plane moved parallel for 250 mm in the direction receding from the center axis of the vehicle. As for the width direction, the region between the first border plane and the second border plane comes easily into the visual field of the vehicle operator. As is shown in FIG. 8, a central region of a visual field 45 is determined as a region that comes easily into the visual field of the vehicle operator and is located between the first border plane and the second border plane excluding the peripheral region within 150 mm from the peripheral edge of the windshield. The observer's eyepoint 3 can be decided at the design stage for each vehicle, based on the normal seat position of the vehicle operator. Moreover, if this point is set in a specific spatial range, then it is sufficient to determine the above region 45 as the sum of each region determined according to the above-described manner by regarding each point within that range as an eyepoint.

Figure 9:
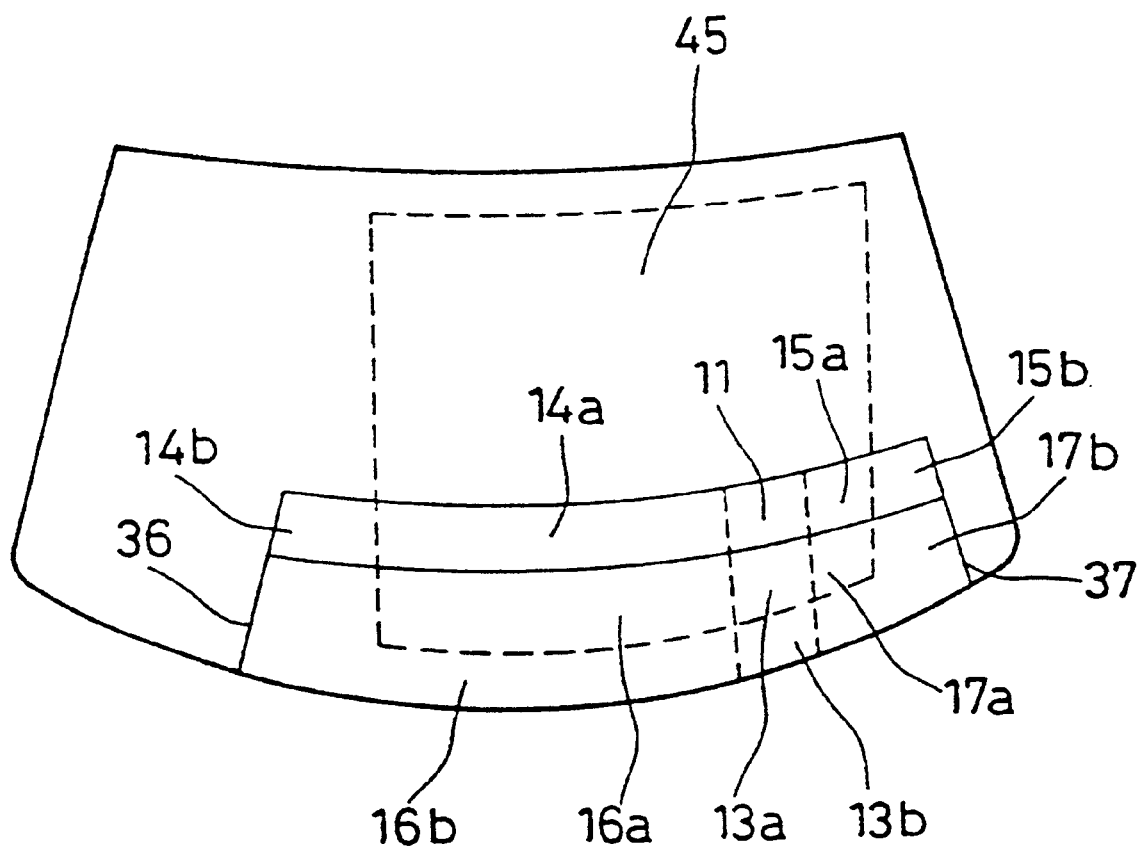
FIG. 9 is a plan view showing yet another example of the windshield glass included in a first HUD device.

By taking this region 45 in consideration, ground surfaces can be formed such that edges 36 and 37 of the ground surfaces 14 and 15 contacting the side of the reflecting surface are placed outside the region 45, as shown in FIG. 9. Thus, the influence of the optical distortion reasonably can be reduced.

Furthermore, it is preferable that the wedge angles of the ground surfaces 13a, 14a, 15a, 16a, and 17a in the region 45 are not more than 5 mrad, and particularly not more than 3 mrad. As for the wedge angles of the ground surfaces 14b, 15b, 16b, and 17b outside the region 45, there is not such a strict upper limit as for the ground surfaces inside the region 45.

Figure 10:
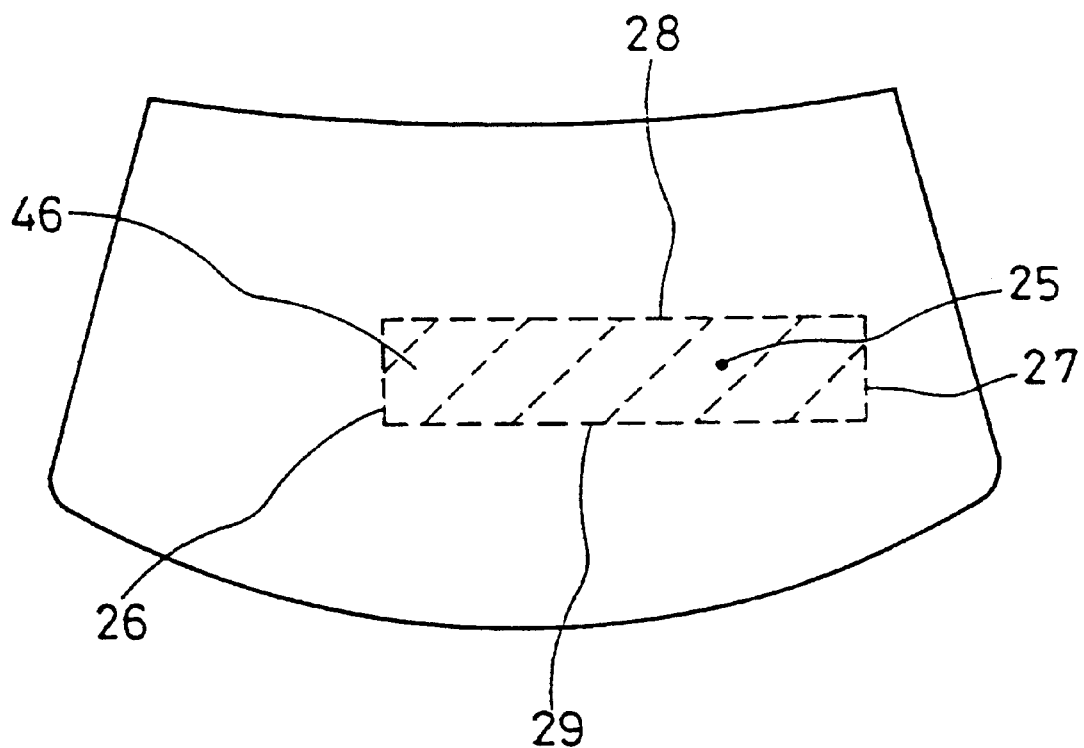
FIG. 10 is a drawing illustrating another center region of a visual field in the windshield glass included in a first HUD device.

As is shown in FIG. 10, depending on the kind of vehicle, the horizontal plane including the reference point can be moved parallel for 100 mm up and down, and a third border plane 28 and a fourth border plane 29 can be determined, so that the surface of the windshield glass that is surrounded by the first to fourth border planes is defined as a central region 46 of the viewing field. Also in this case, it is preferable that the wedge angles of the ground surfaces in the central region 46 of the viewing field are not more than 5 mrad, and particularly not more than 3 mrad.

Figure 11:
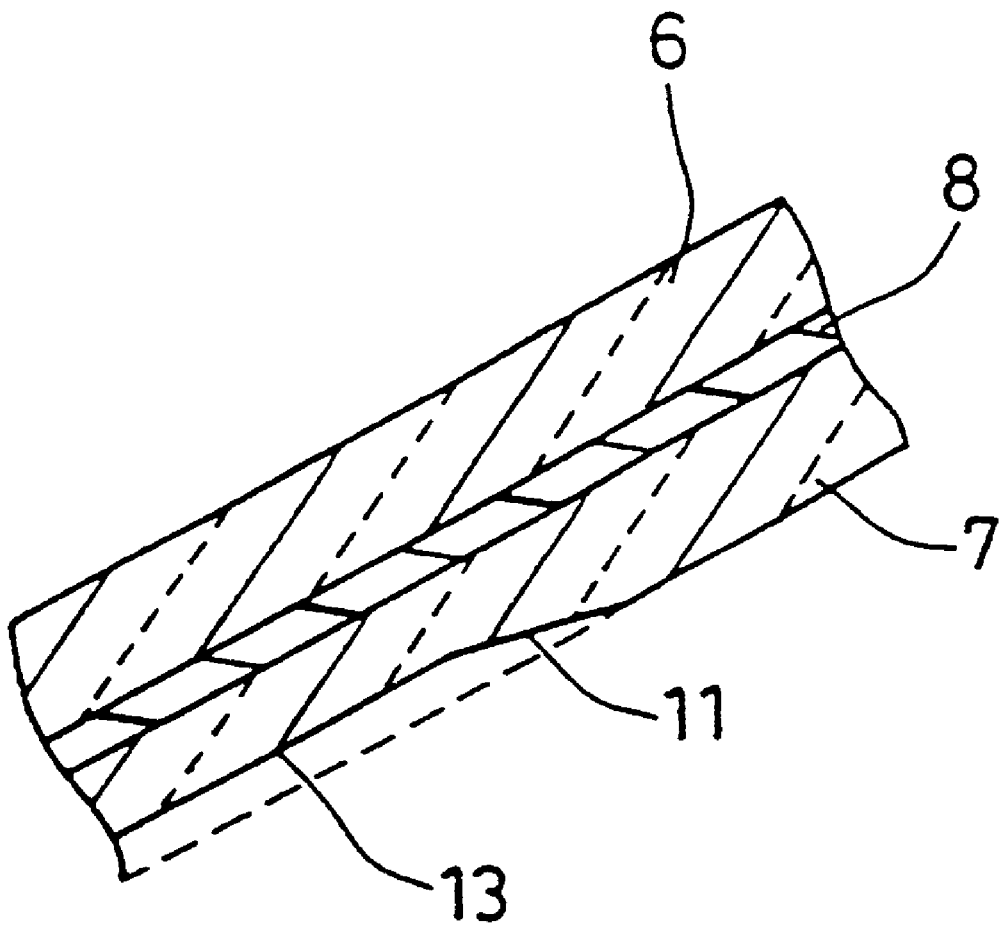
FIG. 11 is a cross-sectional drawing illustrating one embodiment of a laminated glass according to the present invention.

The windshield glass consists usually of laminated glass. Normally, the laminated glass is made by joining two glass sheets with an intermediate layer of e.g. PVB film. For example, to obtain a windshield glass having a cross section as shown in FIG. 6, a laminated glass with a cross section as shown in FIG. 11 may be installed in the vehicle body. This laminated glass is manufactured by joining a glass sheet 7, whereon a reflecting surface 11 and a ground surface 13 connected thereto has been ground on the internal side, to another glass sheet 6 with an intermediate layer 8.

The following is an explanation of one method for processing a glass sheet having a ground reflecting surface 11 and a ground surface, as the glass sheet 7 in FIG. 11.

Figure 12:
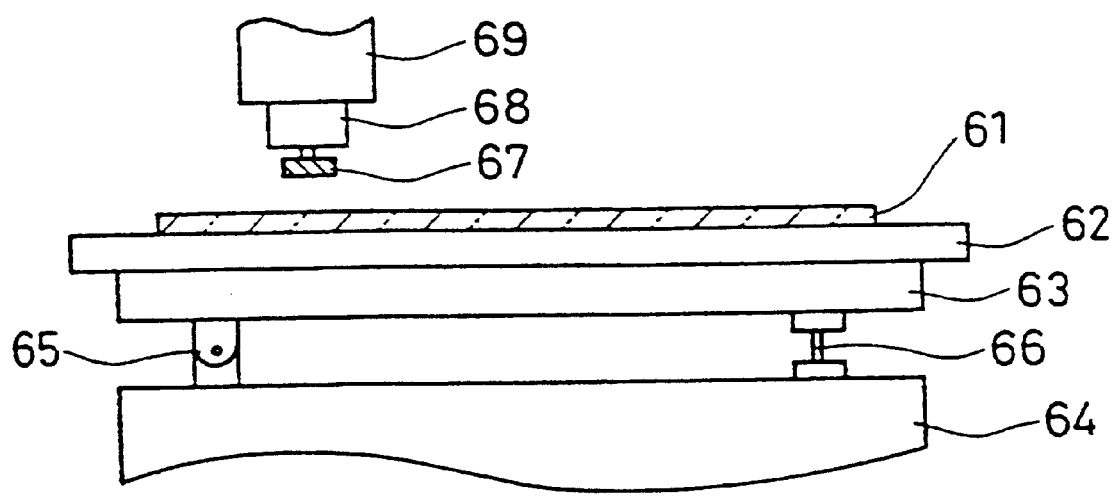
FIG. 12 is a drawing illustrating an example of a device for grinding a glass sheet to be used as the windshield glass included in a HUD device according to the present invention.

FIG. 12 shows an example of a device for grinding the surface of a glass sheet at a certain angle. This device has an angle adjustment mechanism comprising a lower inclined table 64, an upper inclined table 63, a supporting portion 65 connecting the two tables, and an inclination adjustment device 66. By extending and contracting the inclination adjustment device 66 and fixing it at a certain length, the upper inclined table 63 is rotated around the supporting portion, and a certain angle between the two tables 63 and 64 can be set. A glass sheet 61 is fixed with an adhesive table 62 on the upper inclined table 63. To fix the glass sheet, numerous suction holes are arranged in the surface of the adhesive table 62. These suction holes are connected to an exhaust pump (not shown in the drawing).

Figure 13:
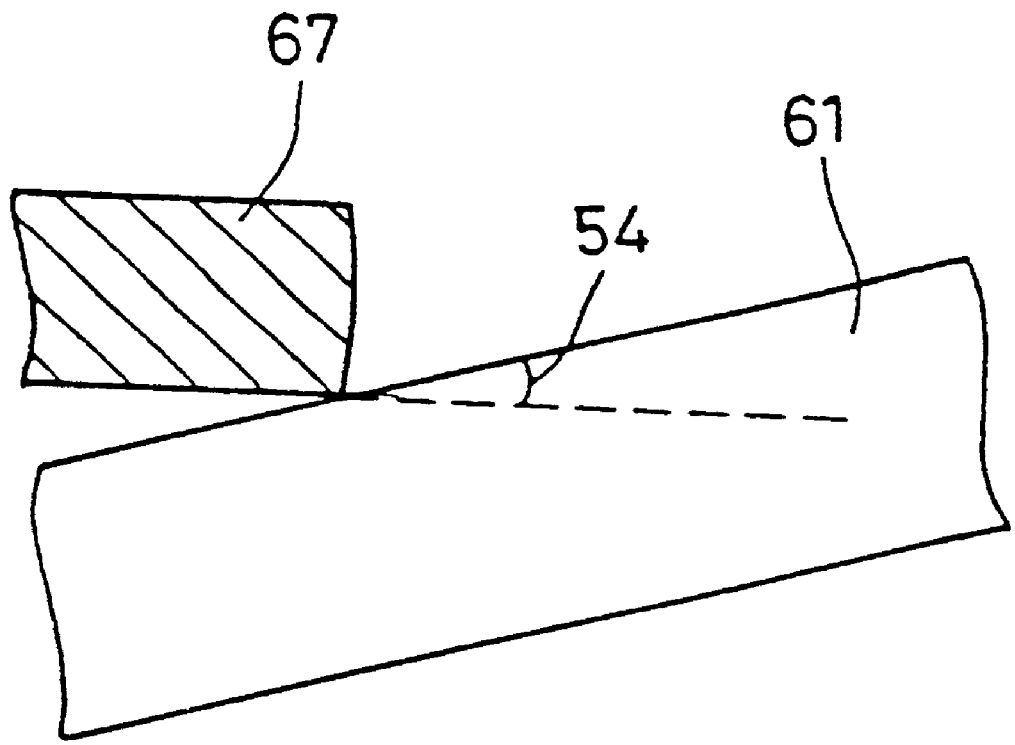
FIG. 13 is a drawing showing an enlargement of a ground portion of the glass sheet in the device shown in FIG. 11.

The surface of the glass sheet 62 is inclined at a certain angle and ground by a grindstone 67 that can be rotated at a certain velocity by a motor 69, to which it is connected via a main shaft 68. Because the glass sheet is inclined, the grindstone 67 will grind the surface of the glass sheet 61 at a certain wedge angle 54, as shown in FIG. 13. The wedge angle 54 can be determined accurately with the angle set by the angle adjustment mechanism and a correction value that is predetermined for each device.

Figure 14:
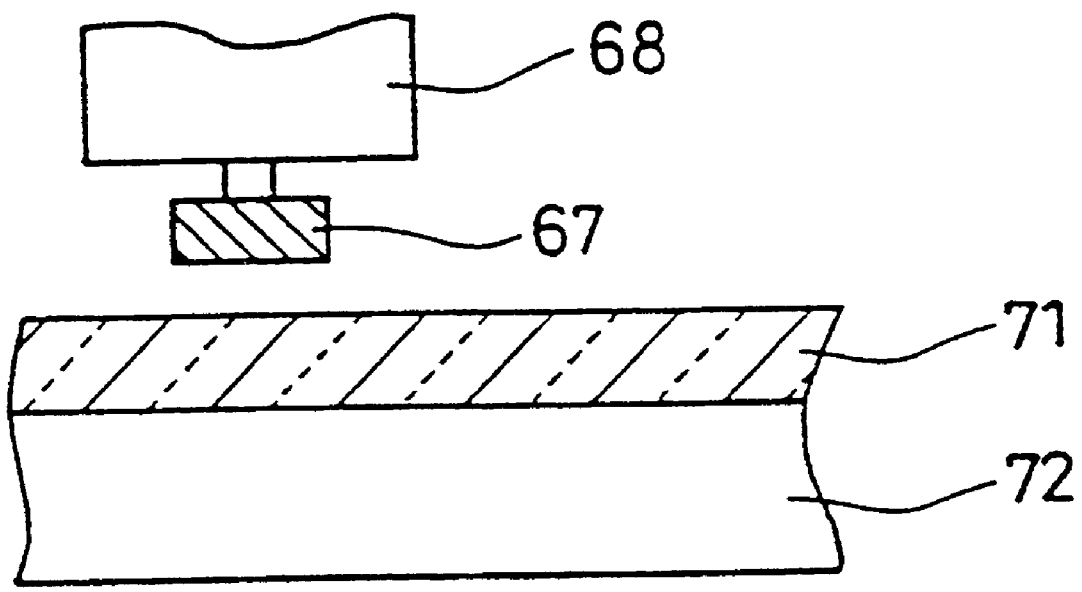
FIG. 14 is a drawing illustrating another example of a device for grinding a glass sheet to be used as a windshield glass included in a HUD device according to the present invention.
Figure 15:
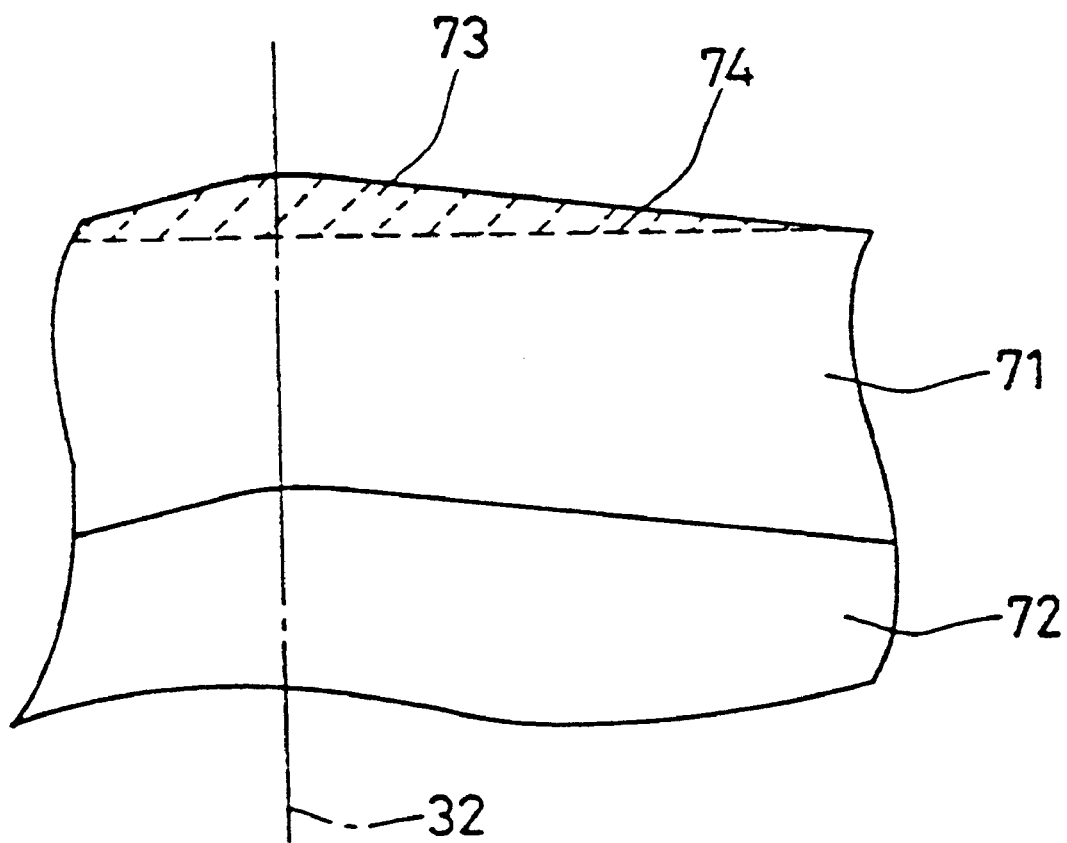
FIG. 15 is a drawing showing a glass portion to be ground using the device shown in FIG. 13.

Another example of a method for processing a glass sheet is explained using FIGS. 14 and 15. The device shown in FIG. 14 is characterized in having a certain minute projection on an adhesion table 72 fixing a glass sheet 71. Consequently, the glass sheet 71 is fixed to the table 72 while being deformed along this projection. As is shown enlarged in FIG. 15, the glass sheet is fixed in a state of elastic deformation. In this state, the grindstone 67 grinds the glass sheet while maintaining a certain height 74, and a projecting portion 73 of the glass sheet corresponding to the projecting portion of the table is shaved off. When released from the table 72, a concave portion corresponding to the projecting portion 73 has been formed in the glass sheet 71. In the example shown in FIG. 15, the apex of the projecting portion 73 will be the edge 32 joining the reflecting surface and the ground surface of the windshield glass (see FIG. 2).

For explanation, the angle 54 and the projecting portion 73 in FIGS. 13 and 15 have been illustrated larger (emphasized) than they really are, but as has been pointed out above, the wedge angle desired for a windshield glass is extremely small. Consequently, the ground portion and the amount of elastic deformation of the glass may be smaller than in the drawings.

It is preferable that the surface thus produced by grinding a glass sheet is finished smoothly so that it has no local minute irregularities. Therefore, it is preferable in the grinding of a glass sheet that several different grindstones are used one by one for their respective best uses from the initial grinding to the finishing polishing. In particular, it is preferable that the irregularities in the surface of the glass sheet are not more than 2 $\mu$m per 1 mm length, even more preferable are not more than 1 $\mu$m irregularities per 1 mm length.

Thus, a glass sheet whose surface has been partially ground can be made into a laminated glass as shown in FIG. 11 using conventional methods, and this glass sheet can be used for the windshield glass for a HUD device.

Second HUD Device

Hereinafter, preferred embodiments of a second HUD device will be described.

In the above second HUD device, the angle between the ground reflecting surface and the non-ground surface of the windshield glass is preferably between 0.1 mrad and 5.0 mrad, and particularly between 0.2 mrad and 1.0 mrad.

Moreover, in the above HUD device, it is preferable that the first reflecting surface is formed by grinding, and the second reflecting surface is a non-ground surface. Accordingly, water and dust etc. are less likely to accumulate in a ground concave portion.

Moreover, in the above HUD device, it is preferable that the ground reflecting surface is formed by grinding the surface of the windshield glass such that the grinding depth from the glass surface increases approaching the information projection means. Accordingly, the reflecting surface that is advantageous for restraining ghost images can be obtained.

The angle of the reflecting surface needed for eliminating ghost images is different in compliance with the incident angle of light rays from the information projection means even at the same reflecting surface. This incident angle is influenced by the distance from the information projection means. Therefore, it is preferable in the HUD device that the ground reflecting surface is divided into at least two regions and the angle of each region increases as the region approaches the information projection means.

Moreover, although it is not intended to give a particular limitation, the above HUD device is particularly effective for suppression of ghost images in a HUD device having such a large screen size that the distance between a first edge on the side of the information projection means and a second edge that is opposite to the first edge is at least 5 cm on the reflecting surface.

A laminated glass for a second head-up display device, used as a windshield glass together with information projection means emitting information as light rays, includes a reflecting surface for reflecting the light rays toward an observer in a vehicle, and comprises at least two glass sheets attached to each other with an intermediate layer. The reflecting surface includes a ground surface formed by partially grinding a surface of the glass sheets, and the ground reflecting surface is divided into at least two regions, and the angle between the reflecting surface and the surface of the glass in a non-ground state increases as the region approaches the position for the information projection means.

The preferred embodiments of a second HUD device will be further described below with reference to the drawings.

Generally, one embodiment of the second HUD device also has the same cross section illustrated in FIG. 1. As explained to the first HUD device with the use of FIG. 1, ghost images are prevented from appearing by the two surfaces 11 and 12 arranged non-parallel to each other.

Figure 16:
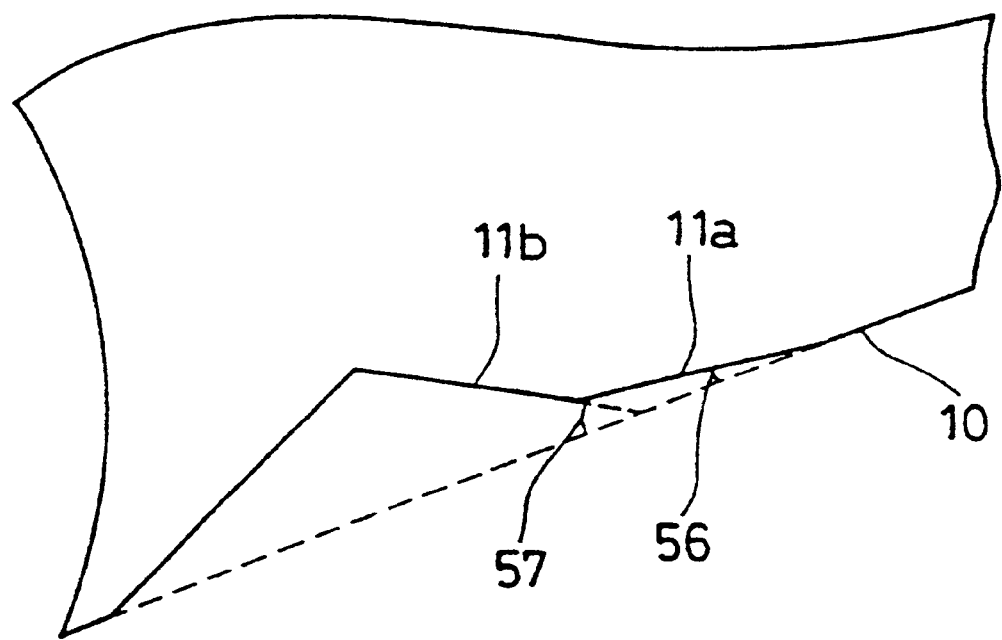
FIG. 16 is an enlarged drawing of a windshield glass used for a second HUD device.
Figure 17:
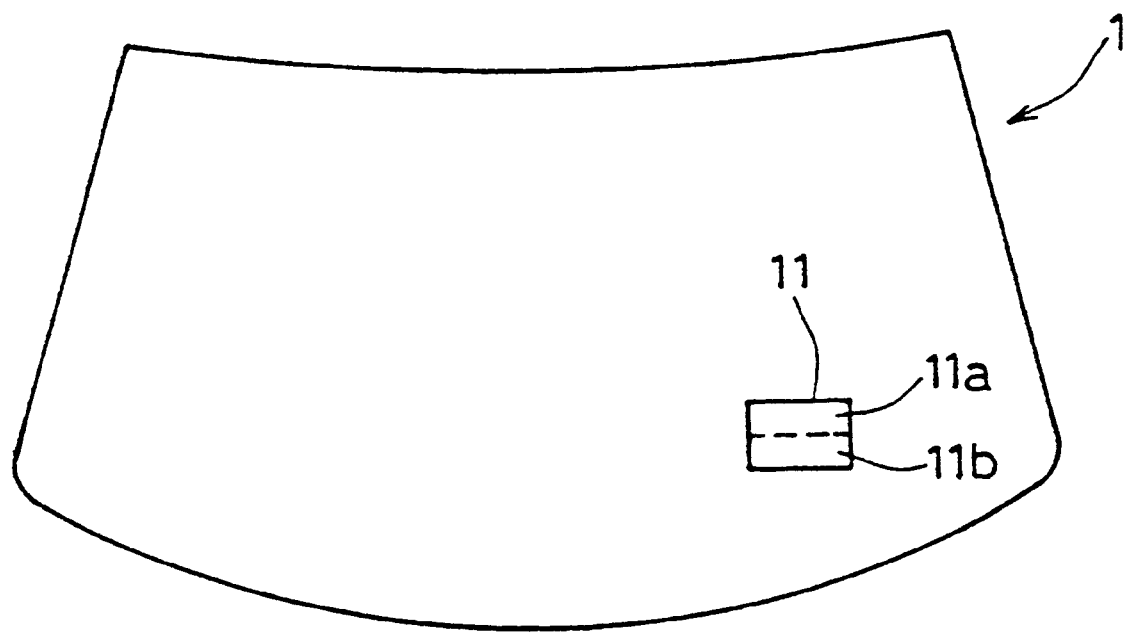
FIG. 17 is a plan view showing an example of the windshield glass included in a second HUD device.

However, in the second HUD device, the reflecting surface includes regions having different angles formed with the non-ground surface 10 of the windshield glass. This difference in the angle will be explained by using FIGS. 16 and 17. As shown in FIG. 17, the reflecting surface 11 is divided into two belt-like regions 11a and 11b. As shown in FIG. 16, the two regions 11a and 11b are formed into surfaces provided with different wedge angles 56 and 57 (the wedge angle 56<the wedge angle 57).

The wedge angle needed for suppressing ghost images varies according to the incident angle of the information light ray emitted from the information projection means 2. Therefore, particularly when the screen size is large, the reflecting surface is preferably divided into at least two regions in compliance with the distance from the information projection means. Specifically, as shown in the figures, the reflecting surface is preferably divided into at least two belt-like regions by dividing the reflecting surface with a line segment extending in the longitudinal direction. The division in compliance with the distance from the information projection means makes it easy to optimize the wedge angle for each region.

The number of the regions to be divided is not particularly limited as long as the number is larger than 2. The reflecting surface 11 may be divided into three belt-like regions 11a, 11b and 11c as shown in FIG. 17, for example, and may be divided into smaller regions. Also in this case, as described above, it is preferable that each wedge angle is determined such that the wedge angle is larger as the region approaches the information projection means (For example, in FIG. 18, when each wedge angle of the regions 11a, 11b, and 11c are defined as the wedge angle 56, the wedge angle 57, and the wedge angle 58, it should satisfy the wedge angle 56<the wedge angle 57<the wedge angle 58).

Figure 18:
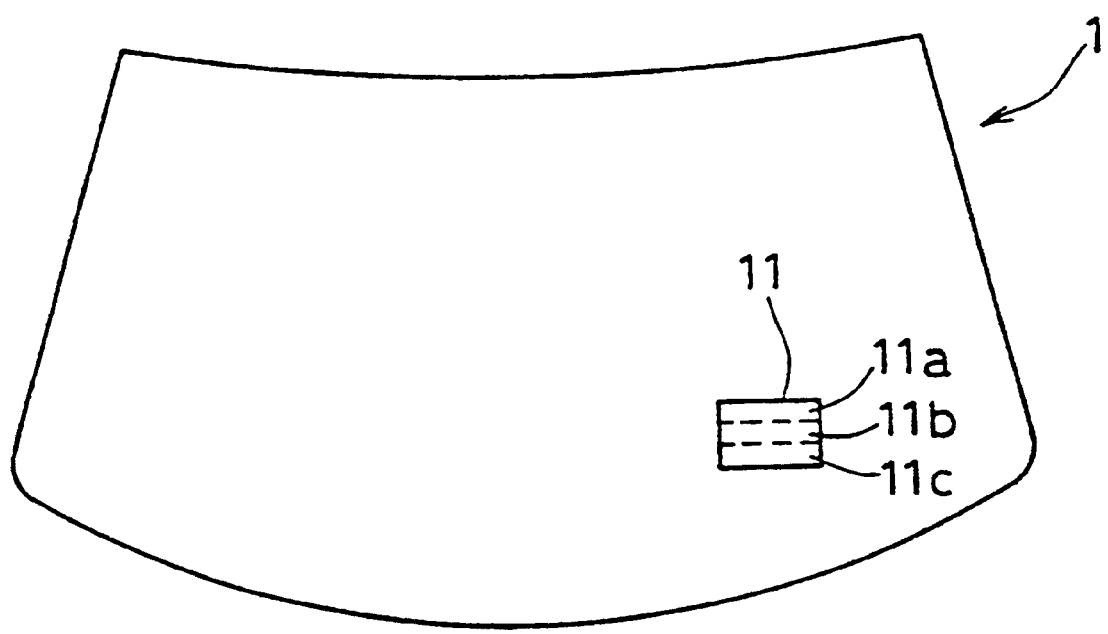
FIG. 18 is a plan view showing another example of the windshield glass included in a second HUD device.
Figure 20:
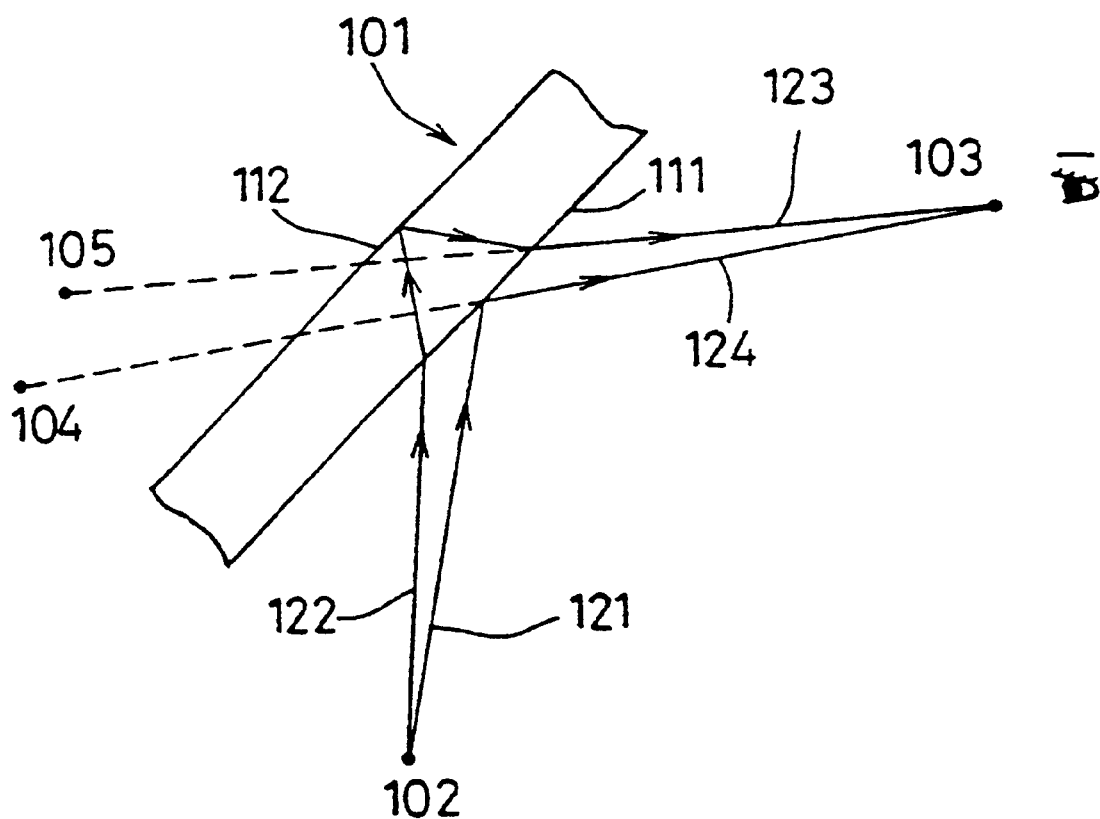
FIG. 20 is a drawing showing an example of a conventional HUD device taken from a cross-sectional direction of a windshield glass.
Figure 21:
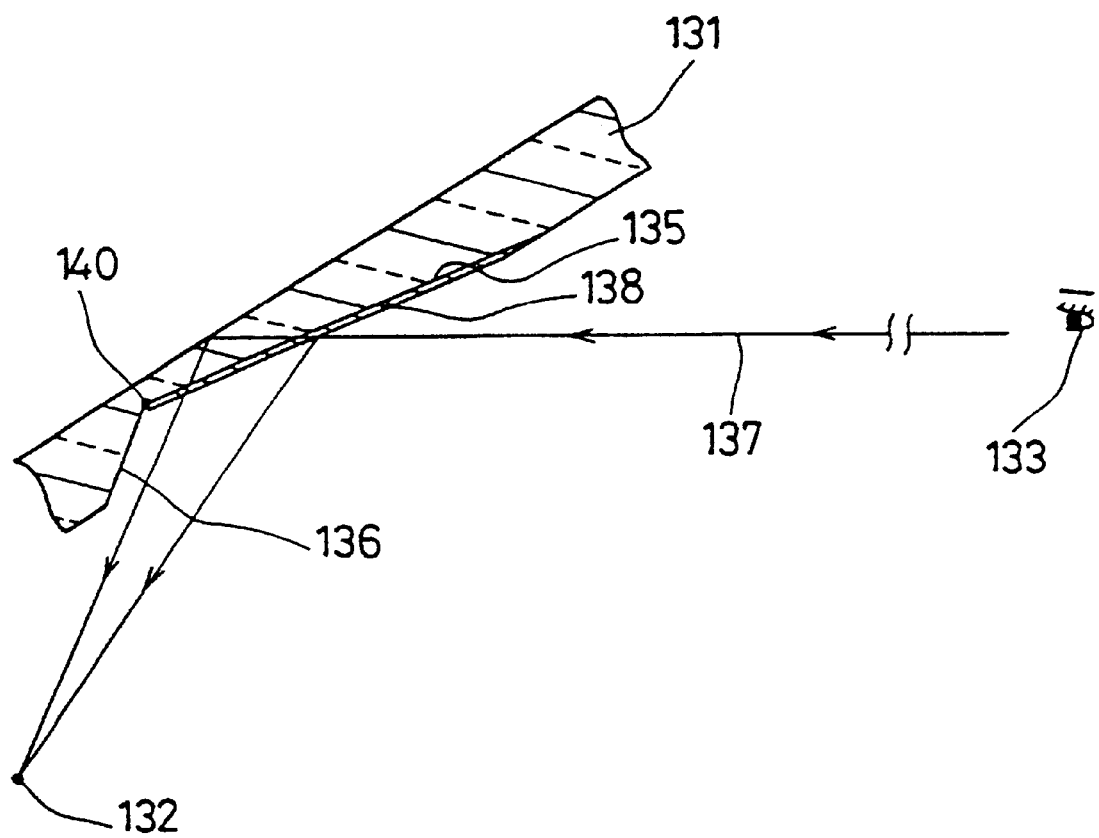
FIG. 21 is a drawing showing another example of a conventional HUD device taken from a cross-sectional direction of a windshield glass.

The reflecting surface may be divided into a grid. Such a way of dividing makes it possible to determine the wedge angle for each region even more preferably for a reflecting surface provided in a windshield glass that is bent three-dimensionally. In such a case, as shown for example in FIG. 19, the three regions 11a, 11b and 11c shown in FIG. 18 are divided further into nine regions 81–89 by the line segments extending vertically, so that the wedge angle preferable for suppression of ghost images can be determined for each region.

The optimized wedge angles of the regions as shown in FIG. 19 are exemplified in the following tables.

Coefficients needed for calculating the optimized wedge angles also are shown respectively in the tables. The incident angle of information light rays to an inner surface of the windshield glass is represented by θ. The distance between the light source (e.g. numeral 2 in FIG. 1) and the reflecting point of image is represented by x. The distance between the reflecting point of image and the eyepoint (e.g. numeral 3 in FIG. 1) is represented by y. The distance between the reflecting point of image and the image forming point (e.g. numeral 4 in FIG. 1) is represented by z. The curvature of the windshield glass along the vertical line is represented by Rv. The thickness of the windshield glass is set to be 4.96 mm, and the refractive index of the windshield glass is set to be 1.52.

Table 1 shows the wedge angles in the cases where the reflecting surface has the size of 52.5 mm in height and 105 mm in width. Table 2 shows the wedge angles in the cases where the reflecting surface has the size of 105 mm in height and 420 mm in width. The wedge angles shown in Tables 1 and 2 are needed for eliminating ghost images at the center point of each region.

TABLE 1

| Region | | θ [°] | x | y | z | Rv | Wedge Angle [mrad] |
|---|---|---|---|---|---|---|---|
| 11a | 81 | 65.8 | 92 | 865.3 | 1135.08 | 18800 | 0.561 |
|  | 82 | 65.8 | 92 | 863.1 | 1136.98 | 18000 | 0.562 |
|  | 83 | 65.8 | 92 | 862.2 | 1138.18 | 17300 | 0.563 |
| 11b | 84 | 63.8 | 90 | 871.6 | 1128.70 | 18800 | 0.578 |
|  | 85 | 63.8 | 90 | 870.0 | 1130.00 | 18000 | 0.579 |
|  | 86 | 63.8 | 90 | 868.6 | 1131.70 | 17300 | 0.580 |
| 11b | 87 | 61.5 | 88 | 879.0 | 1121.38 | 18800 | 0.603 |
|  | 88 | 61.5 | 88 | 877.4 | 1122.68 | 18000 | 0.604 |
|  | 89 | 61.5 | 88 | 876.0 | 1124.38 | 17300 | 0.605 |

TABLE 2

| Region | | θ [°] | x | y | z | Rv | Wedge Angle [mrad] |
|---|---|---|---|---|---|---|---|
| 11a | 81 | 70.3 | 105 | 851.0 | 1149.38 | 18500 | 0.553 |
|  | 82 | 70.3 | 105 | 843.0 | 1157.08 | 18000 | 0.555 |
|  | 83 | 70.3 | 105 | 838.3 | 1162.08 | 17500 | 0.561 |
| 11b | 84 | 63.8 | 90 | 878.2 | 1122.10 | 18500 | 0.579 |
|  | 85 | 63.8 | 90 | 870.0 | 1130.00 | 18000 | 0.579 |
|  | 86 | 63.8 | 90 | 865.9 | 1134.40 | 17500 | 0.582 |
| 11b | 87 | 51.7 | 75 | 905.0 | 1094.78 | 18500 | 0.737 |
|  | 88 | 51.7 | 75 | 898.1 | 1101.98 | 18000 | 0.738 |
|  | 89 | 51.7 | 75 | 893.7 | 1106.68 | 17500 | 0.739 |

In Tables 1 and 2, x, y, z and Rv are shown in millimeters.

As shown in Tables 1 and 2, it is clear that the preferable wedge angle for eliminating the ghost images in each region that belongs to the reflecting surface has wider difference in compliance with the position of the region as the reflecting area is enlarged. The wedge angle mainly is influenced by the incident angle of the information light rays to the region, that is, the distance from the information projection means.

The windshield glass consists usually of laminated glass. Normally, the laminated glass is made by joining two glass sheets with an intermediate layer of e.g. PVB film. An example of a cross-sectional view of this laminated glass is illustrated as a cross-sectional drawing in FIG. 11. Furthermore, as for the processing method of the glass sheet, the method explained with respect to the first HUD device may be used.

In addition to the windshield glass as described above, for the above first and the second HUD devices, an information display device, a collimator etc. are arranged appropriately in the vehicle. These devices are not particularly limited to those that are conventionally used in HUD devices, and, for example, a liquid crystal device, an LED display device etc. can be used for the information display device.

INDUSTRIAL APPLICABILITY

As has been pointed out in detail above, using a first and a second HUD devices, ghost images can be suppressed without processing an intermediate layer into a wedge shape. That is to say, a glass sheet is partially ground to form a wedge-shaped portion so that it is advantageous from the viewpoint of defects occurring during the manufacturing process and manufacturing costs.

Furthermore, according to the first HUD device of the present invention, optical distortion occurring when a glass sheet is partially processed also can be suppressed.

Moreover, according to the second HUD device of the present invention, ghost images can be suppressed effectively even in the case where the screen size provided by the HUD device is enlarged.

Thus, the present invention provides an improved HUD device with better security and comfort for the vehicle operator and is extremely useful for the industrial application.

What is claimed is:

1. A head-up display device comprising information projection means emitting information in form of light rays, and a windshield glass having a reflecting surface for reflecting the light rays toward an observer inside a vehicle, wherein a first light path is defined between a first reflecting surface prepared on an internal surface of the windshield glass and the observer by a first light ray that is emitted from the information projection means, reflected by the first reflecting surface, and projected toward the observer, a second light path is defined between the internal surface and the observer by a second light ray that is emitted from the information projection means, refracted into the windshield glass at the internal surface, reflected by a second reflecting, surface prepared on an external surface of the windshield glass, and refracted out of the windshield glass at the internal surface toward the observer, the first reflecting surface and the second reflecting surface are non-parallel to each other so that the first light path and the second light path are approximating each other more than when the first reflecting surface and the second reflecting surface are arranged in parallel to each other, at least one surface selected from the first reflecting surface and the second reflecting surface is a ground reflecting surface formed by grinding the surface of the windshield glass so as to set the non-parallelity of the reflecting surfaces, the surface of the windshield glass includes a ground surface contacting the ground reflecting surface with an angle between 170° and 190°, and a shading band is formed at least in a part of the periphery of the windshield glass, and the ground surface has, in a region where the shading band is formed, an edge that is opposite to the edge contacting the reflecting surface.

2. The head-up display device according to claim 1, wherein the angle between the ground reflecting surface and the non-ground surface of the windshield glass is between 0.1 mrad and 5.0 mrad.

3. The head-up display device according to claim 1, wherein the first reflecting surface is the ground reflecting surface, and the second reflecting surface is a non-ground surface.

4. The head-up display device according to claim 1, wherein the ground reflecting surface is formed by grinding the surface of the windshield glass such that the grinding depth increases approaching the information projection means.

5. The head-up display device according to claim 4, wherein at least an edge of the reflecting surface formed on the side of the information projection means contacts the ground surface.

6. The head-up display device according to claim 5, wherein the surface of the windshield glass further includes a ground surface that contacts an edge adjacent to the edge of the reflecting surface formed on the side of the information projection means.

7. The head-up display device according to claim 1, wherein an angle between the ground surface and the non-ground surface is not more than 20 mrad.

8. The head-up display device according to claim 1, wherein the ground surface has, in a peripheral region within 150 mm from a peripheral edge of the windshield glass, an edge that is opposite to the edge contacting the reflecting surface.

9. The head-up display device according to claim 1, wherein, in a region of the windshield glass excluding a peripheral region within 150 mm from a peripheral edge of the windshield glass, the ground surface and the non-ground surface form an angle of not more than 10 mrad.

10. The head-up display device according to claim 1, wherein, in a region of the windshield glass excluding the region where the shading band is formed, the ground surface and the non-ground surface form an angle of not more than 10mrad.

11. The head-up display device according to claim 1, wherein taking as a reference point an intersecting point of the windshield glass with a center axis of a visual field, where the center axis of a visual field advances from an eyepoint of the observer in the light path parallel to a center axis of the vehicle within a horizontal plane including the eyepoint of the observer, a first border plane is determined by parallel translation of a perpendicular plane including the reference point for 500 mm from the reference point toward the center axis of the vehicle, and a second border plane is determined by parallel translation of the perpendicular plane for 250 mm from the reference point away from the center axis of the vehicle, in the surface between the first and the second border planes, excluding a peripheral region within 150 mm from the periphery of the windshield glass, an angle between the ground surface and the non-ground surface is not more than 5 mrad.

12. The head-up display device according to claim 1, wherein, taking as a reference point an intersecting point of the windshield glass with a center axis of a visual field, where the center axis of a visual field advances from an eyepoint of the observer in the light path parallel to a center axis of the vehicle within a horizontal plane including the eyepoint of the observer, a first border plane is determined by parallel translation of a perpendicular plane including the reference point for 500 mm from the reference point toward the center axis of the vehicle, a second border plane is determined by parallel translation of the perpendicular plane for 250 mm from the reference point away from the center axis of the vehicle, and a third and a fourth border plane are determined by parallel translation of a horizontal plane including the reference point for 100 mm up and down from the reference point respectively, in the surface of the windshield glass circumscribed by the first to the fourth border planes, an angle between the ground surface and the non-ground surface is not more than 5 mrad.

13. A laminated glass for a head-up display device, used as a windshield glass together with information projection means emitting information as light rays, including a reflecting surface for reflecting the light rays toward an observer in a vehicle and comprising at least two glass sheets attached to each other with an intermediate layer, wherein the reflecting surface includes a ground surface formed by partially grinding a surface of the glass sheet, and the surface of the glass sheet includes a ground surface formed so as to contact the ground reflecting surface with an angle between 170° and 190°, a shading band is formed at least in a part of the periphery of the windshield glass, and the ground surface has, in a region where the shading band is formed, an edge that is opposite to the edge contacting the reflecting surface.

14. A head-up display device comprising information projection means emitting information in form of light rays, and a windshield glass having a reflecting surface for reflecting the light rays toward an observer inside a vehicle, wherein a first light path is defined between a first reflecting surface prepared on an internal surface of the windshield glass and the observer by a first light ray that is emitted from the information projection means, reflected by the first reflecting surface, and projected toward the observer, a second light path is defined between the internal surface and the observer by a second light ray that is emitted from the information projection means, refracted into the windshield glass at the internal surface, reflected by a second reflecting surface prepared on an external surface of the windshield glass, refracted out of the windshield glass at the internal surface toward the observer, the first reflecting surface and the second reflecting surface are non-parallel to each other so that the first light path and the second light path are approximating each other more than when the first reflecting surface and the second reflecting surface are arranged in parallel to each other, at least one surface selected from the first reflecting surface and the second reflecting surface is a ground reflecting surface formed by grinding the surface of the windshield glass so as to set the non-parallelity of the reflecting surfaces, and the ground reflecting surface is divided into at least two regions and the angle of each region with the surface of the windshield glass in a non-ground state increases as the region approaches the information projection means so as to reduce the divergence between the first light path and the second light path caused by different incident angles of light rays from the information projection means in compliance with the position in the reflecting surface.

15. The head-up display device according to claim 14, wherein the angle between the ground reflecting surface and the surface of the windshield glass in a non-ground state is between 0.1 mrad and 5.0 mrad.

16. The head-up display device according to claim 15, wherein the ground reflecting surface is formed by grinding the surface of the windshield glass such that the grinding depth increases approaching the information projection means.

17. The head-up display device according to claim 14, wherein the first reflecting surface is the ground reflecting surface and the second reflecting surface is a non-ground surface.

18. The head-up display device according to claim 14, wherein a distance between a first edge on the side of the information projection means and a second edge that is opposite to the first edge is at least 5 cm on the ground reflecting surface.

19. A laminated glass for a head-up display device, used as a windshield glass together with information projection means emitting information as light rays, including a reflecting surface for reflecting the light rays toward an observer in a vehicle and comprising at least two glass sheets attached to each other with an intermediate layer, wherein the reflecting surface includes a ground surface formed by partially grinding a surface of the glass sheet, and the ground reflecting surface is divided into at least two regions, and the angle between the reflecting surface and the surface of the glass in a non-ground state increases as the region approaches the position for the information projection means.

* * * * *